Patented July 16, 1940

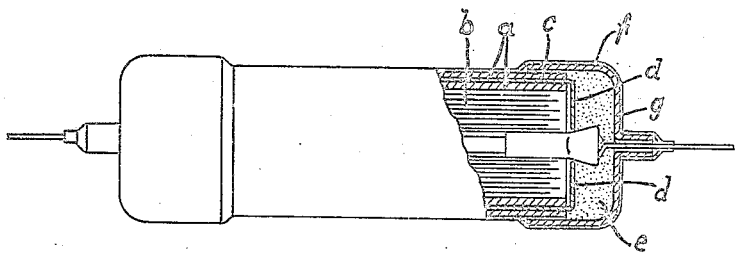

2,207,707

UNITED STATES PATENT OFFICE 2,207,707

CARTRIDGE CONDENSER

Ernst Baer, Berlin, Germany, assignor to Robert Bosch Gesellschaft mit beschränkter Haftung, Stuttgart, Germany Application March 30, 1938, Serial No. 199,001 In Germany April 3, 1937

4 Claims. (Cl. 175—41)

The present invention relates to cartridge condensers and in particular to that type wherein an insulating tube serving as a protecting covering is formed merely by a number of windings of paper, which is continuously wound after the condenser winding has been produced, intermediate layers for strengthening purposes being added in certain circumstances.

Since these condensers are moreover provided, after impregnating, with a lacquer-like coating, there is the danger that, especially if strongly diluted insulating lacquer is employed, the solvent of the lacquer penetrates into the winding from the ends thereof, dissolves the impregnating material, which in a solid condition, is usually not homogeneous, and attacks the paper, so that, after a short time, punctures can occur. The penetration of even the smallest quantities of solvent must therefore be prevented.

According to the present invention, this is achieved by means of windings of insulating material, which project beyond the condenser winding at both front sides and are bent over the front sides so that the latter are wholly covered by the bent over edges.

In condensers according to the invention, for this purpose there are used windings of insulating material which strengthen the insulating tube, which layers project out of the winding at the front side of the condenser in a sufficient breadth.

The invention is more particularly described with reference to the accompanying drawing, which shows a section through a condenser according to the invention on an enlarged scale.

The outer protecting layer $a$ of the condenser winding $b$ consists of a number of windings of the condenser paper, which may be continuously further wound after the condenser winding itself has been produced. Into the final windings of the condenser paper there is wound as well a strip $c$ of oil paper, which projects out of the winding at both front sides of the condenser in a sufficient breadth. Its edges $d$, which are folded round, are not, indeed, capable of preventing the penetration of the very thinly liquid impregnating material $e$ into the winding during the impregnating of the condenser, which is effected in vacuo, but can prevent the penetration of the less thinly liquid insulating lacquer, of which the coating $f$ over the winding and the metallic sealing caps $g$ consists, and which is applied at normal temperature by dipping the condenser into the lacquer.

I declare that what I claim is:

1. A cartridge condenser comprising paper dielectric bands and metal foils wound together and embedded in an insulating tube formed by a number of windings of the condenser paper, which may be continuously wound further after the condenser winding has been produced, a winding of insulating material which is adjacent the periphery of said tube and is wider than the condenser paper and which projects beyond the condenser winding at both front sides and is bent over said front sides to form projecting edges which are bent around and over said front sides to substantially enclose and form protective covers therefor, a lacquer coating for said tube, and metallic caps mounted on the periphery of said condenser tube adjacent the ends thereof, said bent over edges at each front side lying between the end of one of said metallic caps and one of said front sides.

2. A cartridge condenser comprising paper dielectric bands and metal foils wound together and embedded in an insulating tube formed by a number of windings of the condenser paper, which may be continuously wound further after the condenser winding has been produced, windings of intermediate insulating layers wider than the condenser paper, which project beyond the condenser winding at both front sides and are bent over said front sides, a lacquer coating for said tube, and metallic caps on the ends of said tube.

3. A cartridge condenser comprising bands of insulating material and metal foils wound together and embedded in an insulating tube formed by a plurality of windings of said insulating material, which may be continuously wound further after the condenser has been produced, some of the windings of the further wound insulating material being broader than the other windings and projecting beyond the condenser roll at both front sides to form projecting edges which are bent around and over said front sides to substantially enclose and form protective covers therefor, a lacquer coating for said tube, and metallic caps mounted on the periphery of said condenser tube adjacent the ends thereof, said bent over edges at each front side lying between the end of one of said metallic caps and one of said front sides.

4. A cartridge condenser comprising bands of insulating material and metal foils wound together to form a roll having a plurality of windings, some of the said windings of insulating material adjacent the periphery of said roll being wider than the other windings of insulating material and projecting beyond said roll at both front sides and being bent over said front sides to form projecting edges which are bent around and over said front sides to substantially enclose and form protective covers therefor, a lacquer coating for said roll, and metal caps mounted on the periphery of said condenser tube adjacent the ends thereof, said bent over edges at each front side lying between the end of one of said metallic caps and one of said front sides.

ERNST BAER.